(12) United States Patent
Lienhart

(10) Patent No.: US 9,497,383 B2
(45) Date of Patent: Nov. 15, 2016

(54) SURVEYING DEVICE AND METHOD FOR FILTERED DISPLAY OF OBJECT INFORMATION

(75) Inventor: Werner Lienhart, Graz (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 281 days.

(21) Appl. No.: 14/344,854

(22) PCT Filed: Sep. 14, 2012

(86) PCT No.: PCT/EP2012/068147
§ 371 (c)(1),
(2), (4) Date: Mar. 20, 2014

(87) PCT Pub. No.: WO2013/037971
PCT Pub. Date: Mar. 21, 2013

(65) Prior Publication Data
US 2014/0226006 A1 Aug. 14, 2014

(30) Foreign Application Priority Data

Sep. 15, 2011 (EP) .................................... 11181396

(51) Int. Cl.
*H04N 5/232* (2006.01)
*G01C 1/04* (2006.01)
(Continued)

(52) U.S. Cl.
CPC ............ *H04N 5/23293* (2013.01); *G01C 1/04* (2013.01); *G01C 11/02* (2013.01); *G01C 15/00* (2013.01); *G06T 11/60* (2013.01)

(58) Field of Classification Search
CPC ................................................ H04N 5/23293
See application file for complete search history.

(56) References Cited

U.S. PATENT DOCUMENTS 7,098,997 B2 8/2006 Shirai et al.
2009/0003725 A1* 1/2009 Merkel ................ G06T 7/0081
382/274
(Continued)

FOREIGN PATENT DOCUMENTS

DE 197 107 22 A1 10/1997
DE 199 267 06 A1 12/1999
(Continued)

OTHER PUBLICATIONS

European Search Report dated Jan. 23, 2012 as received in Application No. EP 11 18 1396.

*Primary Examiner* — James Pontius
(74) *Attorney, Agent, or Firm* — Maschoff Brennan

(57) ABSTRACT

A geodetic surveying device has a sighting unit pivotable about two axes. The sighting unit defines a target direction in a coordinate system and has a camera for capturing a camera image substantially in the target direction. The device can display object data that is stored in a database with a respective position reference indicating a position in the coordinate system. The device includes a graphical output unit that displays the camera image and the object data. The device has a filter functionality for the object data, with dynamic filtering based on the current range of view and static filtering based on a user selectable or specifiable selection criterion. The filtered object data is displayed on the output unit with markings representing the object data conjointly with the camera image. The markings are displayed at a respective point in the camera image referenced by the position reference.

20 Claims, 8 Drawing Sheets

(51) Int. Cl.
  *G01C 15/00*       (2006.01)
  *G01C 11/02*       (2006.01)
  *G06T 11/60*       (2006.01)

(56) References Cited

U.S. PATENT DOCUMENTS

| | | | |
|---|---|---|---|
| 2011/0066375 A1 | 3/2011 | France et al. | |
| 2013/0201328 A1* | 8/2013 | Chung | H04N 7/183 348/143 |
| 2014/0347475 A1* | 11/2014 | Divakaran | G06K 9/00771 348/135 |
| 2014/0350886 A1* | 11/2014 | Metzler | G01S 7/003 702/150 |
| 2015/0095769 A1* | 4/2015 | Zhang | G06K 9/00456 715/243 |
| 2015/0266475 A1* | 9/2015 | Tanzmeister | B60W 30/0956 701/301 |

FOREIGN PATENT DOCUMENTS

| | | |
|---|---|---|
| DE | 199 495 80 A1 | 4/2000 |
| DE | 103 28 828 A1 | 4/2004 |
| EP | 1 293 755 A1 | 3/2003 |
| EP | 1 469 281 A2 | 10/2004 |
| EP | 1 686 350 A1 | 8/2006 |
| JP | 2004-347516 A | 12/2004 |

\* cited by examiner

SURVEYING DEVICE AND METHOD FOR FILTERED DISPLAY OF OBJECT INFORMATION

FIELD OF THE INVENTION

The invention relates to a geodetic surveying device with a sighting unit, a camera and an output unit and a method according to the invention for filtered displaying of information using a geodetic surveying device.

BACKGROUND

For measuring a target point or, in particular, a plurality of target points, numerous geodetic surveying devices have been known since antiquity. In this case, distance and direction or angle and from a measuring device to the target point to be measured are recorded and, in particular, the absolute position of the measuring device together with reference points possibly present are detected as spatial standard data.

Well-known examples of such geodetic surveying devices include a theodolite, tachymeter and a total station, which is also referred to as electronic tachymeter or computer tachymeter. One geodetic measuring device from the prior art is described in the publication document EP 1 686 350, for example. Such devices have electrical-sensor-based angle and distance measuring functions that permit direction and distance to be determined with respect to a selected target. In this case, the angle and distance variables are determined in the internal reference system of the device and, if appropriate, also have to be combined with an external reference system for absolute position determination.

In many geodetic applications, there is surveying of points by virtue of specially embodied target objects being placed there. These usually consist of a plumb rod with a module that can be sighted, for example with a reflector for defining the measurement path or the measurement point. These target objects are sighted by means of a surveying device, a direction and a distance to the objects is determined and hence a position of the object is derived.

Analogously to this surveying of a point, there can be defining or marking of target points already known in terms of coordinates or of points, the positions of which were defined in the run-up to a marking procedure. In contrast to the surveying of points, the position or the coordinates of the points to be defined are known and to be marked in this case. A plumb rod or a surveying rod, which is guided by a user and positioned on a target point, is usually likewise used for such a procedure. For this, the user can approach the target position of the target point on the basis of position information generated by the surveying device, wherein the surveying rod is sighted by the surveying device, either by a second person or automatically by automation assigned to the surveying device. Once the target point has been reached, the user can undertake marking of the point.

Modern surveying devices, such as a total station, have microprocessors for digital processing and storing of captured measurement data. The devices are generally produced with a compact and integrated configuration, wherein coaxial distance elements and angle measurement elements, which are usually coaxial, and also computing, control and storage units are integrated in one device. Depending on the configuration level of the total station, means for motorizing the target optical unit, for reflector-less distance measuring, for automated target search and tracking and for remote control of the whole device are integrated.

Total stations known from the prior art moreover have a radio data interface for establishing a radio link to external peripheral components such as e.g. a data capture device, which, in particular, may be embodied as a portable data logger, remote control unit, field computer, notebook, minicomputer or PDA. By means of the data interface, it is possible to output measurement data captured and stored by the total station for external processing, to read externally captured measurement data into the total station for storage and/or processing, to input and/or output remote control signals for remotely controlling the total station or a further external component, in particular during mobile field use, and to load control software into the total station.

For sighting or targeting the target point to be surveyed, geodetic surveying devices of the generic type for example have a telescopic sight, such as e.g. an optical telescope, as sighting device. The telescopic sight is generally rotatable about a vertical axis and about a horizontal tilting axis relative to a base of the measuring device, such that the telescopic sight can be aligned with the point to be surveyed by pivoting and tilting. Modern devices can have, in addition to the optical viewing channel, a camera for capturing an image, said camera being integrated into the telescopic sight and being aligned for example coaxially or in a parallel fashion, wherein the captured image can be displayed, in particular, as a live image on the display of the display control unit and/or on a display of the peripheral device—such as e.g. the data logger or the remote control unit—used for remote control. In this case, the optical unit of the sighting device can have a manual focus—for example an adjusting screw for altering the position of a focusing optical unit—or have an autofocus, wherein the focus position is altered e.g. by servomotors or it has fixed focusing in conjunction with a wide-angle lens. Automatic focusing devices for telescopic sights of geodetic devices are known e.g. from DE 197 107 22, DE 199 267 06 or DE 199 495 80.

On an image captured by the camera, it is moreover possible—in accordance with known embodiments of generic surveying devices—to insert superposed information in respect of target points, the points themselves, object structures and further object data. By way of example, this data can originate from a three-dimensional terrain model. By means of such provision of design data on a display together with the captured image, it is possible to carry out controlling or monitoring of construction advances. Such an electronic surveying device with an image capture unit and an output unit for displaying design data is known for example from EP 1 496 281.

In the case of such a display of object data in an image captured by a camera, the number of objects or amount of information in relation to objects shown in the image may vary strongly depending on the respective measurement condition. By way of example, if the viewing field of the camera is aligned in a direction in which a multiplicity of stored object data lie in the viewing field, a superposed display of the information can appear very confusing, in particular to a user, due to many intersecting symbols.

Accordingly, in respect of the prior art, what is disadvantageous in superposed display forms is that although much information or many structures are displayed simultaneously in a camera image, an operator of the surveying system only requires a small proportion of the wealth of information on show for carrying out his measuring object. Until now, the operator in such a case had to laboriously identify the object data in the image relevant to him. Within the scope of the measuring process, this procedure means much time is spent and it moreover harbors that error source of the operator of the system selecting information differing from the desired information as a result of the multiplicity of displayed object data. Furthermore, objects captured in the image may be covered by the information displayed in the image or may not be identifiable, even though the image objects should perspectively be in the image foreground.

SUMMARY

It is therefore an object of the present invention to provide a method and a measuring apparatus, wherein an amount of data shown on a display can be reduced within the scope of user prescriptions, in particular wherein it is possible for only the object data relevant to the user to be able to be displayed in a camera image.

A special object of the invention consists of designing the display of object data in an image in such a way that, depending on the respective measurement requirement, only relevant data are shown.

The invention relates to a geodetic surveying device, in particular a total station or a theodolite, which can be calibrated in a coordinate system such that, in a calibrated state, a setup position and an alignment of the surveying device are known, comprising at least one sighting unit that is pivotable about two axes, in particular a telescopic sight, wherein the sighting unit defines a sighting direction in the coordinate system and comprises a camera with a current viewing region for capturing a camera image substantially in the sighting direction, wherein the viewing region can be updated depending on the sighting direction. Here, a capture direction of the camera can e.g. be offset in parallel to or coaxial with the sighting direction (i.e. to the emission direction of a laser beam provided for the distance measurement) such that the camera image then can be captured substantially in the direction of the sighting direction, in particular wherein the camera image is embodied by a live image. The surveying device furthermore has an angle and distance measuring functionality, object data stored in a database, wherein the object data are stored with a respective position reference, in particular object coordinates, specifying a position in the coordinate system, a graphical output unit, on which the camera image and the object data can be displayed, and a control and processing unit.

Furthermore, the surveying device has a filter functionality, within the scope of which, when carrying out the filter functionality, there is, automatically controlled by the control and processing unit, dynamic filtering, wherein the object data are filtered depending on the current viewing region within the scope of the dynamic filtering, and static filtering, wherein the object data are filtered depending on a selection criterion that can be selected or predetermined by the user within the scope of the static filtering, wherein the selection criterion depends on a position relation, an angle relation, an object property and/or information provided by the surveying device. Moreover, only the object data filtered by the dynamic and static filtering are displayed graphically by means of markings representing the object data on the output unit together with the camera image, wherein the markings are displayed on a respective position in the camera image referenced by the position reference.

The filtering according to the invention of the object data can be advantageous, in particular if the amount of data displayed in a camera image has reached a wealth that leads to the object captured by the camera no longer being identifiable or being covered due to the multiplicity of inserted data or markings for the data. A user of a total station according to the invention can, within the scope of the invention, have unwanted data or the markings thereof removed or only have wanted data inserted, depending on a selected filter option. Here, the filtering can take place taking into account the respective position of the object data in relation to the position of the total station and relative to obstacles situated in the viewing region of the camera. Furthermore, the filtering can also take place depending on an angular range (within the viewing region of the camera) definable from the view of the camera. Accordingly, it is possible to insert or remove data situated within or outside of the angular range in respect of the position thereof. Furthermore, filtering can take place dependent on object properties, i.e. it is possible to take into account additional information in respect of objects, e.g. the shape or form of an object (e.g. target marker, retroreflector, etc.), a category to which the object can be assigned (road, building, terrain, vegetation, manhole cover, street lighting, etc.) and/or colored features of the object. Moreover, the filter can be supplied with information from the total station, wherein this information is generated by e.g. components of the total station, e.g. in the sighting unit by a current positioning of a focusing lens and/or by an additional distance measurement to an object. In this context, e.g. measured values that are already processed and data yet to be processed both can be taken into account as object data. Hence, it is also possible to filter those objects whose distance and angle relative to the total station (position reference) are known, but the coordinates of which have not yet been calculated in the respective system.

In order to carry out the filter functionality, an appropriate data storage unit, e.g. a solid-state storage (e.g. hard disk or USB stick) or a data CD, is provided on the part of the surveying device and a data processing unit is provided, wherein the filter functionality is stored in the storage unit as software package or computer program product and can be executed on the surveying device in such a way that the filtering takes place by means of the surveying device. The filtering when executing the filter functionality can therefore substantially take place within the scope of a data processing routine predetermined by the filter functionality, taking into account surveying device parameters and the stored object data.

Within the scope of the static and dynamic filtering, it is possible in each case to generate subsets with object data identified during the respective filtering. Thus, firstly, all object data whose position can be assigned to a position within the viewing region of the camera can be assigned to a dynamic subset and all those object data which satisfy a specific selection criterion can be assigned to static subset. Within the scope of the filter functionality, the object data or markings for the object data are then displayed, which are present both in the dynamic subset and in the static subset, i.e. an intersection set of the subsets is formed and the object data in the intersection set are displayed.

In the context of the invention, a dynamic filter is understood to be a filter which filters out a set of object data from a totality of object data depending on the alignment of the camera and hence on the viewing field of the camera, wherein the composition of the set is varied (automatically) when the sighting direction is changed, e.g. when sighting different targets, and the filter is therefore referred to as dynamic. Such a change in alignment can, in particular, take place continuously by pivoting the sighting unit. By contrast, a static filter is understood to mean a filter, the filtered object data of which is kept, even during a change in alignment or in the case of alternative influences from the surroundings. This filtering takes place on the basis of a selection criterion that can be selected by a user, wherein those object data can be filtered out, which satisfy the set selection criterion. The static filtering can be defined by a user and, in so doing, can be maintained until the user deactivates the filter or selects a different selection criterion for the static filtering.

For a better overview in the displayed camera image, the object data can be represented by, for example, object-specific symbols or markings. Thus, a position of a road sign can be represented by e.g. a specific marking, which was assigned to a group "road signs" in advance, rather than by the display of the coordinate values in the camera image. Moreover, the object data can be shown with different levels of detail, i.e. it is possible, for example, for only a position to be represented by a symbol or additionally for an object ID (identification for an object) to be inserted.

In particular, the markings or object data can be displayed without the camera image, wherein—depending on the arrangement and information density—it is possible to display a (sketch-like) perspective display of the surroundings that can correspondingly be captured by the camera.

In order to carry out a precise measurement, the surveying device can be calibrated within a terrain or a coordinate system by means of a calibration procedure, i.e. the surveying device can be set up at a setup point and points whose coordinates are known can be sighted in the terrain and surveyed in respect of angle and distance. From a surveyed number of known points, depending on the measurement object, it is thus possible to determine the position and the alignment of the surveying device in a geodetic precise manner and further measurements can be carried out precisely proceeding from the calibrated surveying device. Moreover, the current setup position and the alignment of the surveying device can be entered manually into the device, for example by means of a keyboard on the device, and the positioning and alignment—even in the coordinate system—can therefore be known.

Furthermore, according to the invention, the selection criterion can be definable depending on a distance threshold and/or angle threshold. Thus, for example, a distance can be defined proceeding from the location of the surveying device, wherein those object data or the markings of the object data can be inserted, the position of which specified by the position reference defines either a shorter or a longer distance from the total station. Analogously to this, it is also possible to determine a horizontal or vertical angle (or an angle in a plane rotated from the horizontal plane) from the view of the camera. In so doing, it is then possible, for example, to insert or remove object data markings, the position of which is defined on a specific side of a plane defined by the angle.

Furthermore, according to the invention, the selection criterion can be definable depending on a current distance measurement and/or a current position of a focusing lens, in particular wherein the position of the focusing lens can be adjusted manually or automatically, in particular by means of an autofocus functionality. By means of the distance measurement to an object, e.g. to a prism or a target marker, it is possible, for example, to establish a distance value, wherein the distance value can be used as filter criterion. In so doing, it is possible, for example, to insert or remove markings or object data which have a shorter or further distance from the setup position of the surveying device, or those which lie within a specific tolerance range about the measured distance value. This can occur, in particular, during a continuous distance measurement to a target, wherein, in that case, e.g. only objects within a specific distance around the target are superposed in the image. Moreover, the filtering by means of the selection criterion can be carried out by the current position of the focusing lens. In this context, it is possible for e.g. an object in the camera image, e.g. a tree or a building, to be put into focus by varying the position of the focusing lens and for a distance to this object to be deduced on the basis of the resulting lens position. Filtering of the data can then take place substantially analogously to taking into account the distance measurement during the filtering.

In particular, according to the invention, the selection criterion can be definable in such a way that those object data which have a position, defined by the respective position reference, within a first distance range defined in relation to the setup position of the surveying device and/or within a second distance range defined in relation to the position of specific object data and/or within a defined angular range, in particular wherein the angular range can be defined in the viewing region, and/or within an image region defined in the camera image, can be inserted or removed when carrying out the filter functionality.

Firstly, it is therefore possible to set a distance range about the setup position of the surveying device, for example in the form of a circle or ring, as a result of which a minimum value and a maximum value for a distance to the surveying device is defined. Secondly, it is possible to set a distance range around the position of a marking for specific object data. In so doing, it is possible, for example, to determine a distance threshold or likewise an annular range about this position. Furthermore, an angular range can be set e.g. by defining a lower and/or upper limit for a horizontal and/or vertical angle. As a result of this, it is possible e.g. to define a spherical segment with the surveying device as a center as a relevant filter region. In particular, a region to be taken into account during the filtering can be set by an image region that can be selected in the camera image. The aforementioned regions or ranges can e.g. be determined by a direct marking thereof in the image (camera image or map view) shown on the display, wherein the display can have touch-sensitive configuration for this. In particular, the regions or ranges can also be defined by direct entry of e.g. minimum and maximum values or by setting these values by means of a drop-down menu. Within the scope of the filter functionality, it is possible only to insert or remove those object data or the markings thereof, the defined position of which lies within one of the set regions or ranges.

According to the invention, the selection criterion can furthermore be definable in such a way that, depending on a body position defined by a body and, in particular, depending on a body size, some of the object data can be removed when carrying out the filter functionality, in particular wherein the removed object data are perspectively covered in the camera image due to the body position and the body size of the body, in particular wherein the body is embodied by an object captured in the camera image or by an object predefined virtually. As a result of this function, it is possible to create a better overview, in particular in a displayed camera image, for example for an operator of a surveying device according to the invention, in particular if the object data, as a result of the display of the markings for these, at least partly overlap one another or are displayed in such a way that objects in the camera image are, in part, not visible (since they are covered by the markings). By way of example, the objects can be defined in the camera image, in the map view, by entering coordinates and/or by structures stored in a digital terrain model. If an object, e.g. a building or terrain information, is now selected or determined in the shown camera image (i.e. in the viewing region of the camera), a position comparison can be carried out by means of the filter functionality, wherein the position and, optionally, the extent of the object are compared to the respective object data lying in the viewing region. In so doing, object data can be identified, the markings of which perspectively lie behind or in an object (from the view of the camera of the surveying device) and therefore not visible to e.g. a user. Such markings or information in relation to object data can then be removed from the camera image.

Furthermore, according to the invention, the selection criterion can be definable by means of the camera image, by means of a top view display with the object data displayed therein, in particular by means of a map display, and/or by entering information, in particular position information, by means of an input unit. Thus, the respective selection criterion can be defined by means of, for example, touching the display configured in a touch sensitive manner, while the camera image is shown on the display. Here, the position of the touch can be linked in terms of coordinates to the coordinate system and, as a result of this, regions to be set for the selection criterion can be defined directly in the coordinate system. Analogously to this, there can be a coordinate-based definition in respect of the selection criterion also by means of a map view, i.e. a display from a bird's eye perspective of the surroundings captured in accordance with the camera image. Here too, objects can be marked for determining the selection criterion by touching the display. Moreover, information required for the definition of the selection criterion can be entered by entering data, wherein the data can be transmitted by means of e.g. a keyboard or via a radio, Bluetooth, infrared and/or WLAN interface.

In particular, the filter functionality of the surveying device according to the invention can be carried out automatically, in particular depending on a measurement requirement known in advance. Therefore, the filter functionality can be adapted to, for example, a measurement object and there can be automatic filtering on the basis of the information required for the respective object. This function can significantly simplify a measurement for an operator of a total station by virtue of the fact that said operator need not undertake manual filtering out of unwanted information. By way of example, it is possible, in this context, to insert only those markings for object data when a building outline is to be marked out, which markings have a (predefined) reference to this building and to remove those markings that likewise lie in the viewing field of the camera but are not to be assigned to this marking out process, for example markings of a church tower spire or a summit cross in the background.

The invention furthermore relates to a method for filtered displaying of object data stored in a database of a geodetic surveying device with a respective position reference specifying a position in a coordinate system, wherein the surveying device can be calibrated in a coordinate system such that, in a calibrated state, a setup position and an alignment of the surveying device are known. Within the scope of the method, there is a capture of a camera image using a camera with a current viewing region and a display of the camera image and of the object data on a graphical output unit. Furthermore, there is dynamic filtering, wherein the object data are filtered depending on the current viewing region within the scope of the dynamic filtering, and static filtering, wherein the object data are filtered depending on a selection criterion that can be selected or predetermined by the user within the scope of the static filtering, wherein the selection criterion depends on a position relation, an angle relation, an object property and/or information provided by the surveying device. Moreover, only the object data filtered by the dynamic and static filtering are displayed graphically by means of markings representing the object data on the output unit together with the camera image, wherein the markings are displayed on a respective position in the camera image referenced by the position reference.

Further embodiments or developments of the method according to the invention are described in the dependent claims or have already been described analogously above as developments of the surveying device according to the invention, and can be gathered from these.

In particular, within the scope of the method according to the invention, the filtering and displaying of the object data can be carried out automatically, in particular depending on a measurement requirement known in advance.

Furthermore, according to the invention, the filtering can be carried out depending on a distance threshold and/or angle threshold.

Moreover, according to the invention, the selection criterion can be defined in such a way that the object data which have a position, defined by the respective position reference,
   within a first distance range defined in relation to the setup position of the surveying device and/or
   within a second distance range defined in relation to the position of specific object data and/or
   within a defined angular range, in particular wherein the angular range can be defined in the viewing region, and/or
   within an image region defined in the camera image,
are inserted or removed.

According to the invention, depending on a body position and, in particular, a body size of a body, some of the object data can be removed during filtering, in particular wherein the removed object data are perspectively covered in the camera image due to the body position and the body size of the body.

Furthermore, within the scope of the invention, the filtering can be carried out depending on a current distance measurement and/or a current position of a focusing lens, in particular wherein the position of the focusing lens is adjusted manually or automatically, in particular by means of autofocusing.

Moreover, according to the invention, the selection criterion can be defined by means of the camera image, by means of a top view display with the object data displayed therein, in particular by means of a map display, and/or by entering information, in particular position information, by means of an input unit.

The invention furthermore relates to a computer program product with program code, which is stored on a machine-readable medium and/or executed, for carrying out a method according to the invention for filtered displaying of object data, in particular when the program is executed on an electronic data processing unit embodied as control and processing unit of a geodetic surveying device according to the invention.

BRIEF DESCRIPTION OF THE DRAWINGS

The method according to the invention and the device according to the invention will be described in more detail, in a purely exemplary form, on the basis of specific exemplary embodiments, which are schematically displayed in the drawings, wherein further advantages of the invention will also be discussed. In detail:

FIGS. 1a-b each show a depiction of markings for object data, firstly, superposed on a camera image and, secondly, in a top view display.

DETAILED DESCRIPTION

Figure 1A:
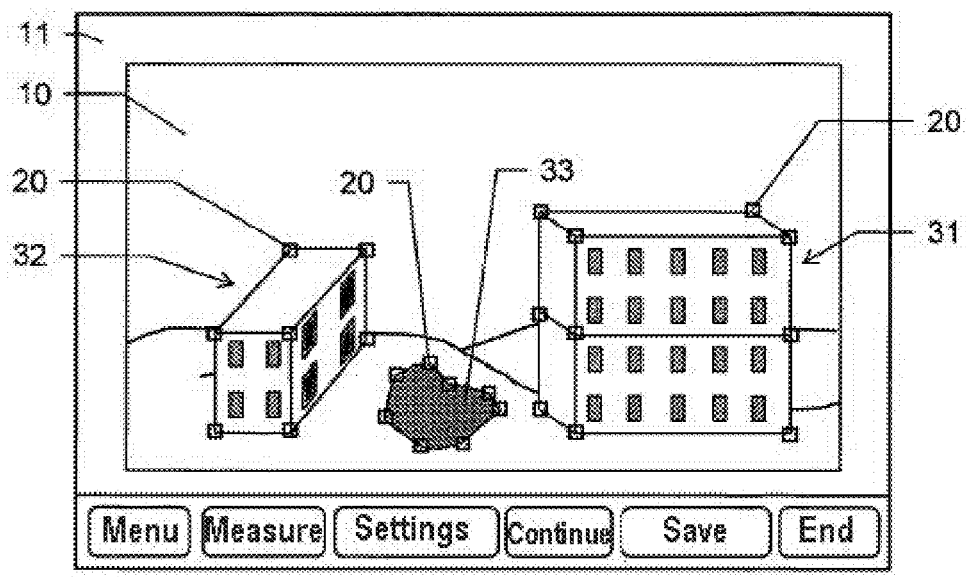
Figure 1B:
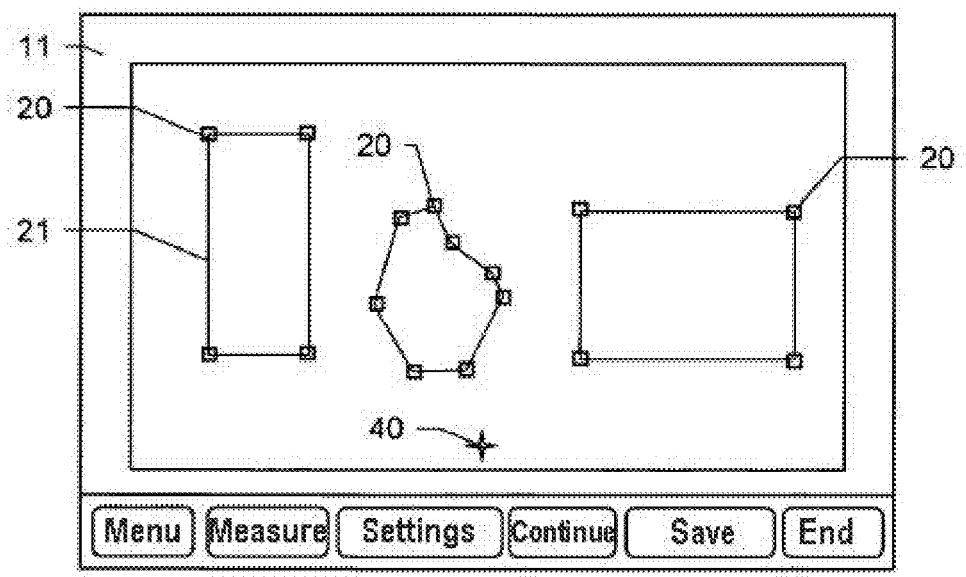

FIGS. 1a, 1b each show a depiction of markings 20 for object data. In FIG. 1a, these markings 20 are displayed inserted into a camera image 10, whereas, in FIG. 1b, only the markings 20 are shown together with a position 40 of a surveying device in a map display. Both displays are output on a display 11 of a surveying device. The markings 20 of the object data in each case represent significant points or outlines 21 of buildings 31, 32, or show points on further objects captured by a camera, such as e.g. points on the shoreline of a lake 33. By way of example, such position information can be used in landscape surveying or when monitoring construction advances, for example in order to carry out or check the positioning of construction elements. A user of a surveying device according to the invention, in so doing, can identify a position for an object in the camera image 10, defined in the run-up to the measurement, and can compare a real position of the object with the set position. Moreover, the user can have information about planned construction sections inserted, e.g. the course of a planned street, or else have displayed information in respect of already existing objects.

Figure 2A:
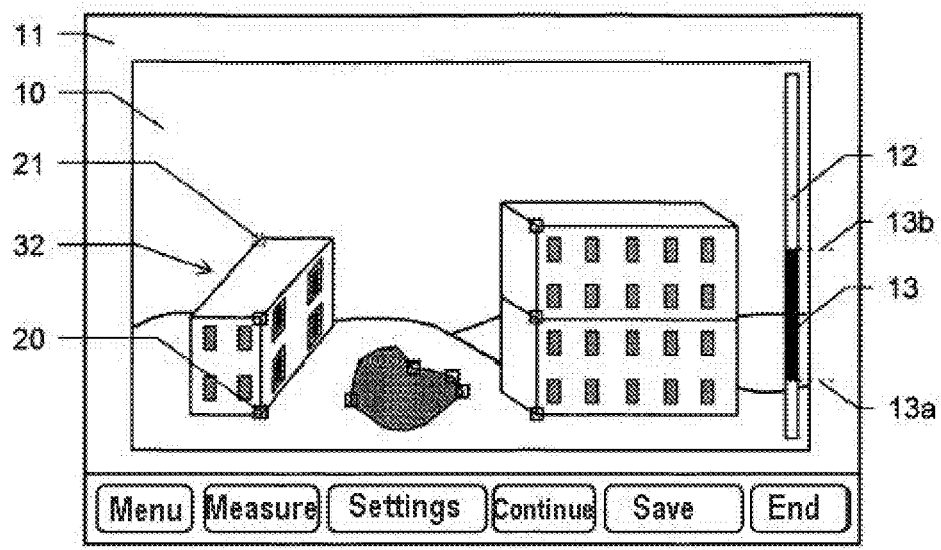
FIG. 2a shows a filtered display according to the invention of markings representing object data in a camera image.

FIG. 2a shows a filtered display according to the invention of object data in a camera image 10, wherein the camera image 10 and the markings 20, 21 of the object data are displayed on a display 11 of a surveying device according to the invention. A bar 12 is shown on the right-hand edge of the camera image 10. The bar 12 moreover shows a range 13 which can represent a distance range for filtering the object data. In the shown embodiment, it is possible, for example, for all object data markings 20 which have a selected minimum distance 13a from a total station of e.g. 15 meters and a maximum distance 13b of e.g. 25 meters to be inserted in the camera image 10. Here, the distance range 13 can, in particular, be defined by entering range limits or be defined by touch by means of a definition of the range limits on an output unit embodied as a touch-sensitive display. Thus, the range 13 in the bar 12 can e.g. be shifted by a stylus or the size of said range, and with this, simultaneously, the distance range 13, can be modified. Furthermore, a position symbol 21 in respect of a corner point of the building 32 is for example shown in a dashed manner; which is situated outside of the defined distance range 13 and removed.

Figure 2B:
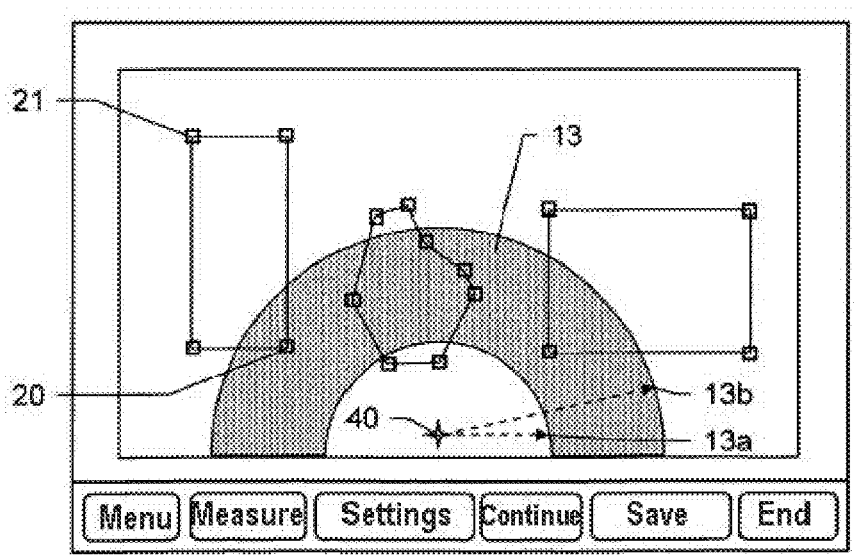
FIG. 2b shows a definition according to the invention of the selection criterion for filtering the object data in a map view.

FIG. 2b shows a definition according to the invention of the selection criterion for filtering the object data, represented by symbols or markings 20, 21, in a map view. Analogously to FIG. 2a, a distance range 13 is selected in this case in such a way that the markings 21 of the object data, the positions of which have a smaller distance from the setup position 40 of the surveying device than the minimum distance 13a of the distance range 13 or which are situated further away therefrom than the maximum distance 13b of the distance range 13, lie outside of the distance range 13 and can therefore be inserted or removed, in particular in a user-defined manner. Those markings 20, which are situated within the distance range 13 due to the position thereof specified by the position reference or position coordinates, can be likewise inserted or removed. Using a corresponding determination of a distance range 13, it is therefore possible to remove or only insert object data in a targeted manner. Moreover, a plurality of such distance ranges 13 can be defined in a camera image or in a map view, wherein, analogously, the included data can be inserted and/or removed.

Figure 3:
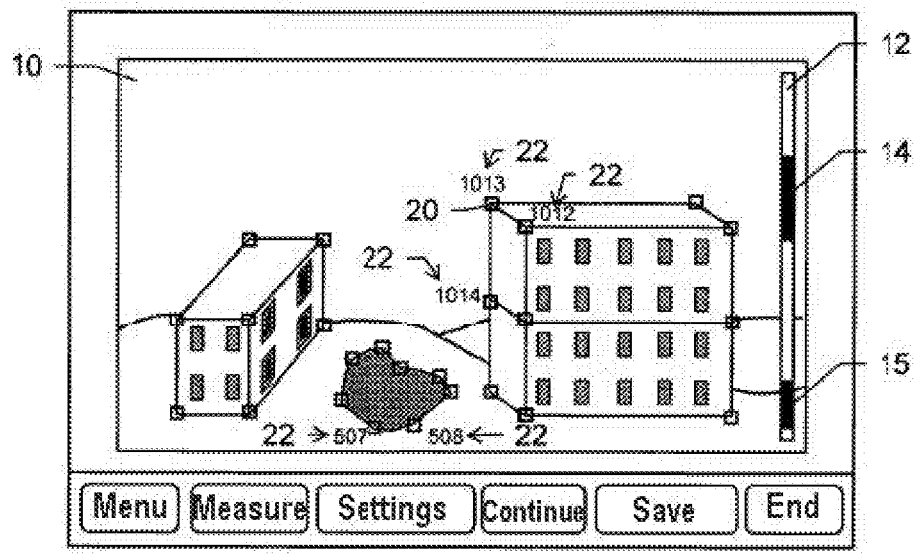
FIG. 3 shows a definition according to the invention of a plurality of distance ranges and a display of object information.

FIG. 3 shows such a definition of a plurality of distance ranges 14, 15 by means of a bar 12 shown in the camera image 10. In this embodiment according to the invention, the filtering defined by means of the distance ranges 14, 15 does not relate to the position-related display of the object data itself, but to the display of information 22 assigned to the respective object data. Hence, it is possible, for example, to insert or remove e.g. identification numbers or absolute position specifications in respect of the markings 20 for the object data depending on the respective distance from the surveying device.

Figure 4A:
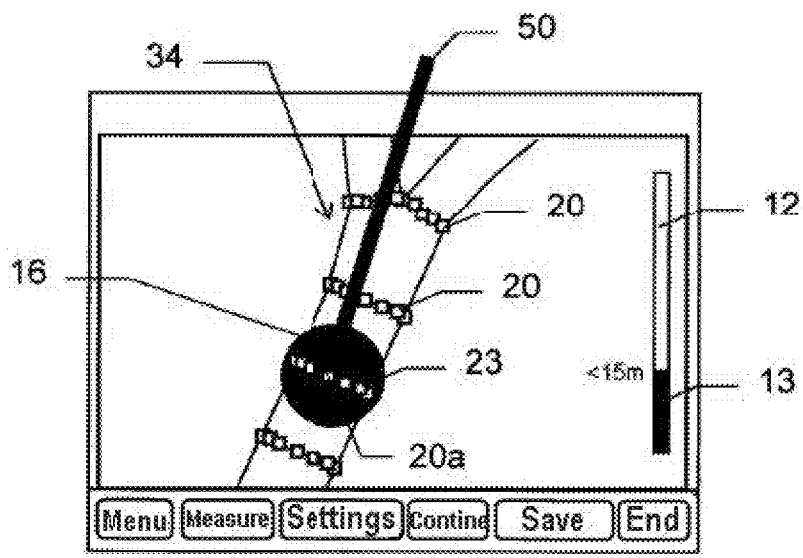
FIGS. 4a-b show a further definition according to the invention of the selection criterion for filtering the object data in a map view and a further filtered display according to the invention of markings for the object data in a camera image.
Figure 4B:
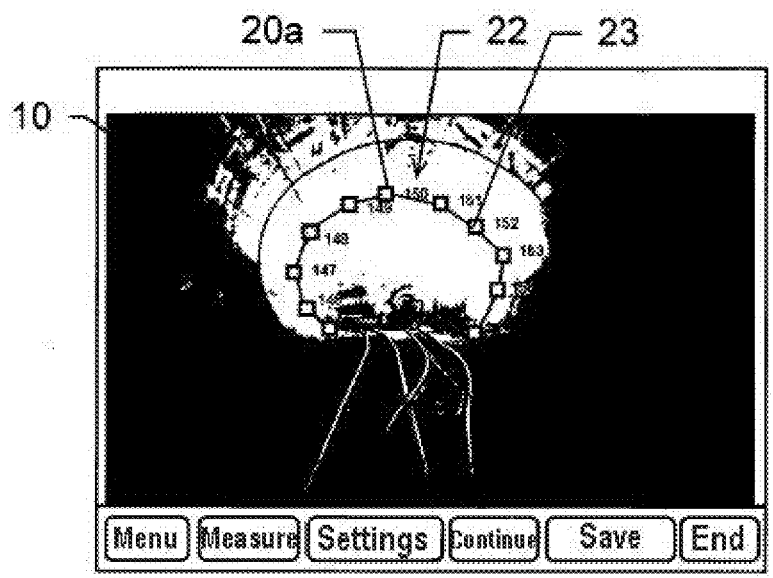

FIGS. 4a, 4b show a further definition according to the invention of the selection criterion for filtering the markings 20, 23 of the object data in a map view, and a corresponding filtered display according to the invention of the markings 23 of the object data in a camera image 10. The map view or the top view display (in a bird's eye view) in FIG. 4a shows a course of a tunnel 34 with markings 20, 23 representing object data stored over the course of the tunnel. Displayed on the edge of the map view is the bar 12, which serves to set a distance range 16, in particular by means of a variable radius of the range 16 about a definable center point or by defining a size of a selection range. The selection of the range 16 or of the radius can be brought about e.g. by entering a specific value or by touching the touch display (and drawing on the display), in particular by a stylus or a pointing device 50 provided for this. In order to set the center point or a reference point for the distance or selection range 16, there can likewise be an entry or touching of the display using the pointing device 50 at a point or touching or selecting a specific displayed marking 20a for an item of object information (=center point or reference point). The distance range 16 can then be set e.g. depending on the setting on the bar 12 and can be varied by changing this setting. In FIG. 4b, the result of the data filtering set in FIG. 4a is shown in a camera view. Here, those object data markings 23 which lie within the distance range 16 about the selected point 20a are displayed on the camera image 10. Additionally, further object information 22 in respect of the markings 23 of the object data is shown. The extent of the distance range 16 and a reference point in relation to the range can, in particular, also be defined in the camera image 10, wherein, in turn, the image is touched by the pointing device 50 and it is thereby possible to determine the size and position of the range 16.

Figure 5:
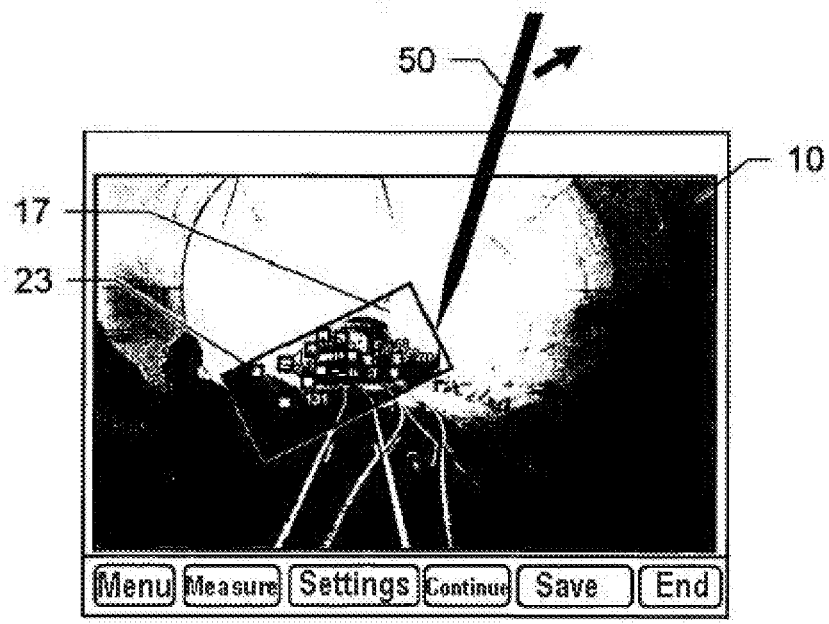
FIG. 5 shows a further filtered display according to the invention of object data in a camera image.

FIG. 5 shows a further filtered display according to the invention of markings 23 showing object data in a camera image 10. Here, it is possible to define a selection region 17, wherein the region 17 can be placed in the camera image 10 by means of the pointing device 50 and varied in respect of its size. The respective markings 23 then can be shown or removed within or outside of the region 17. This region 17 can be defined in a fixed position in the camera image 10. Hence, it is possible to show those markings 23 in the selection region 17 continuously which currently lie in the camera image 10 and within the region 17, for example during a rotation of the surveying system. Those markings 23 which slip out of the region 17 during the rotation can accordingly be removed.

Figure 6:
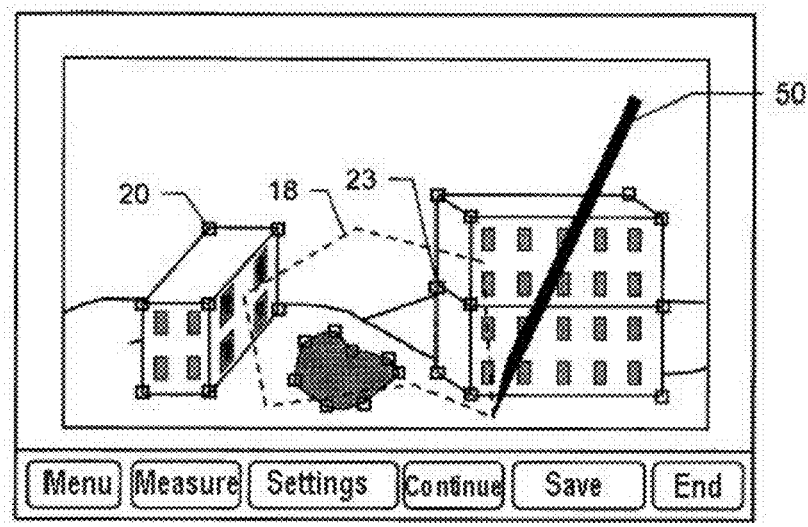
FIG. 6 shows a definition according to the invention of an angular range for filtering the object data.

FIG. 6 shows a definition according to the invention of an angular range for filtering the object data. Here, a region 18 can be defined in the camera image 10—in particular by means of the pointing device 50—by means of which an angular range is defined, both horizontally and vertically, in respect of the position of the surveying device. Here, the angular range can for example be defined by the horizontally and vertically outermost points of the region 18. The object data can then be filtered analogously to the definition of a distance range, i.e. object data which lie within the region 18 can be inserted or removed by means of markings 23. The definition of the angular ranges can moreover be brought about by entering a maximum and/or minimum horizontal angle and/or a maximum and/or minimum vertical angle. In so doing, it is also possible to select whether the markings 20, 23 of the object data, which are situated within or outside of the region (or above or below a predetermined angle), are inserted.

Figure 7:
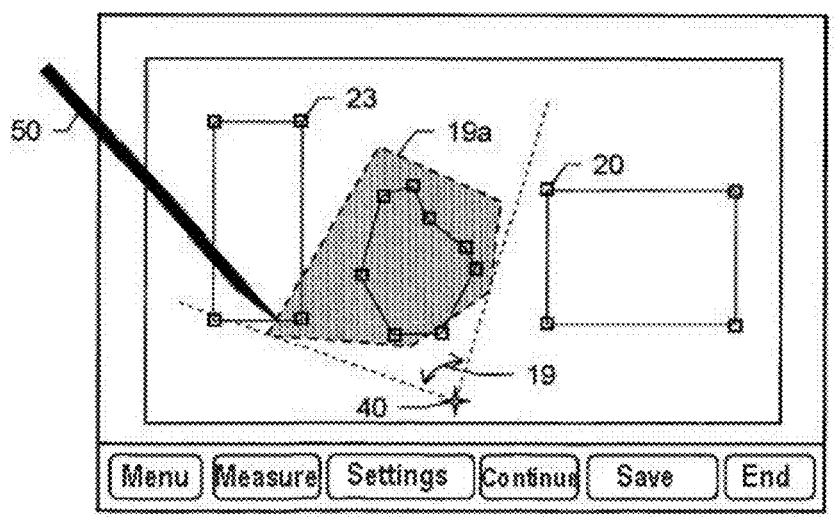
FIG. 7 shows a further definition according to the invention of an angular range for filtering the object data.

FIG. 7 shows a further definition according to the invention of an angular range 19 in a map view for filtering the object data or the markings 20, 23 thereof. Here, a stylus 50 can be used to determine a region 19a in the map display, by means of which the angular range 19 is defined with respect to the position 40 of the surveying device. In the shown embodiment, this range 19 is defined in the horizontal direction. A corresponding horizontal range can be derived and defined, in particular automatically, from the stored position reference of the markings 23 lying in the angular range 19. In particular, in such a definition of the region 19a, it is also possible e.g. only to remove those object data which lie within the region 19a in the map view, without an angular range 19 being defined.

Figure 8A:
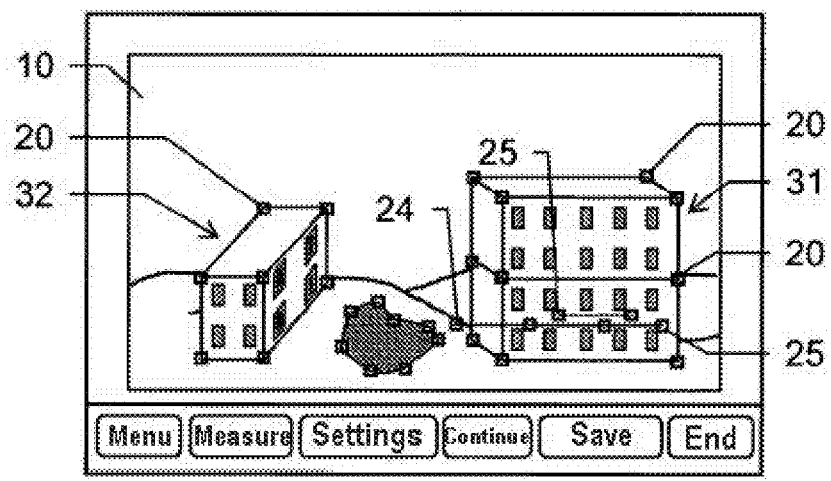
FIGS. 8a-c show a further definition according to the invention of the selection criterion for filtering the object data.
Figure 8B:
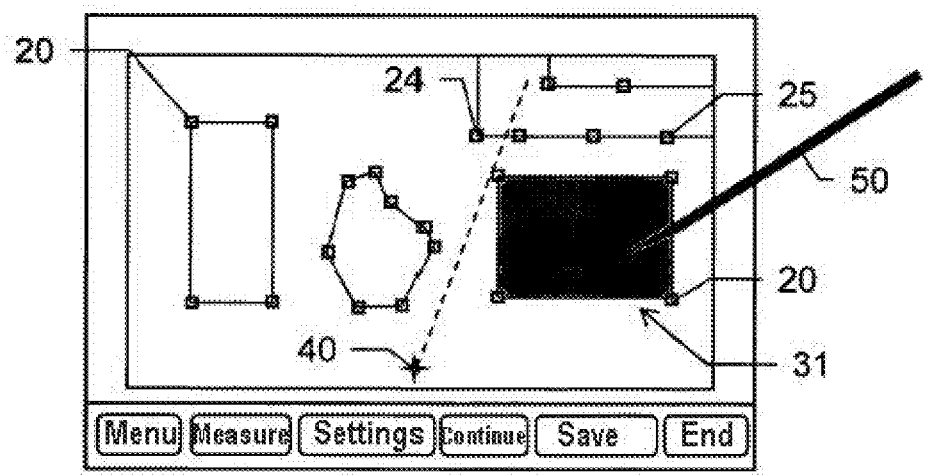
Figure 8C:
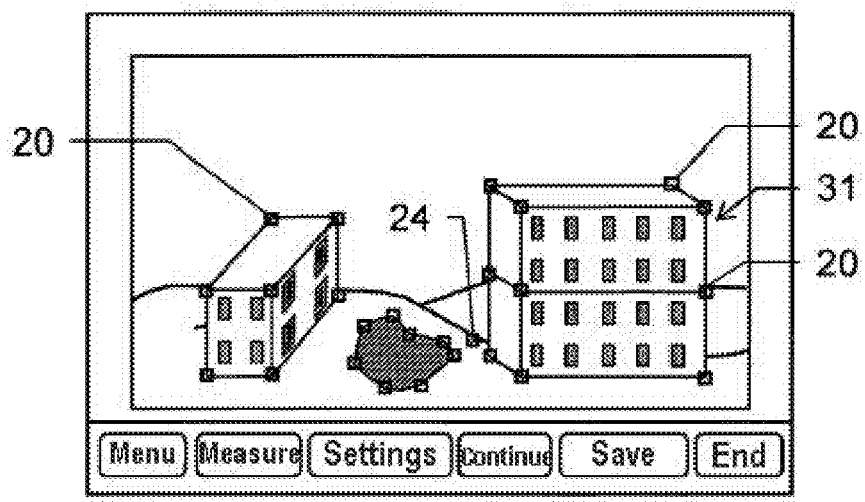

FIGS. 8a-c show a further embodiment according to the invention of the selection criterion for filtering the object data and the graphical representation thereof as markings 20, 24, 25. Here, the figures in each case show two buildings 31, 32 (or the outlines thereof in FIG. 8b) and object data markings 20 belonging to the buildings. In FIG. 8a, markings 24 and 25 are additionally displayed in the camera image 10, wherein these markings and the connection lines thereof overlap with the depiction of the building 31. Such object data (in relation to markings 24, 25) can be stored in a database of the surveying device, but these are displayed e.g. without further filtering together with buildings 31, 32 captured in the image 10 and with further object data markings 20 (as shown). Here, provision is not made for a real perspective display of the markings 20, 24, 25, i.e. object data 25, which would be covered by the building 31 in a perspective manner—from the view of the camera—are inserted despite them actually being covered. In FIG. 8b, the object data are once again shown in a map display by means of the markings 20, 24, 25. Moreover, the position 40 of a total station is displayed. In order to filter those markings 25, which are not perspectively visible (to a user of the surveying system) in the camera image 10 from FIG. 8a, the outline of the building 31 is now selected by a pointing device 50 in the map view and the building 31 is thereby marked as a viewing obstruction. By a comparison of the position information stored with the respective object data, it is possible—taking into account the relative positioning 40 of the total station—that filtering of the object data markings 20, 24, 25 is carried out in such a way that those markings 25, which are covered by the position and optionally the extent of the building 31, are removed. The position and the extent of the building 31 can be derived in this case from the object data (markings 20) assigned to this building 31. Furthermore, an obstacle (in this case: building 31) can also be defined directly in the camera image 10, for example likewise by touching it with a stylus. FIG. 8c shows a camera representation of the measurement situation after filtering, without displaying the covered object data markings 25, wherein the marking 24 is still depicted; however, the connecting line to the next point appears to be cut off at an edge of the building 31.

Figure 9A:
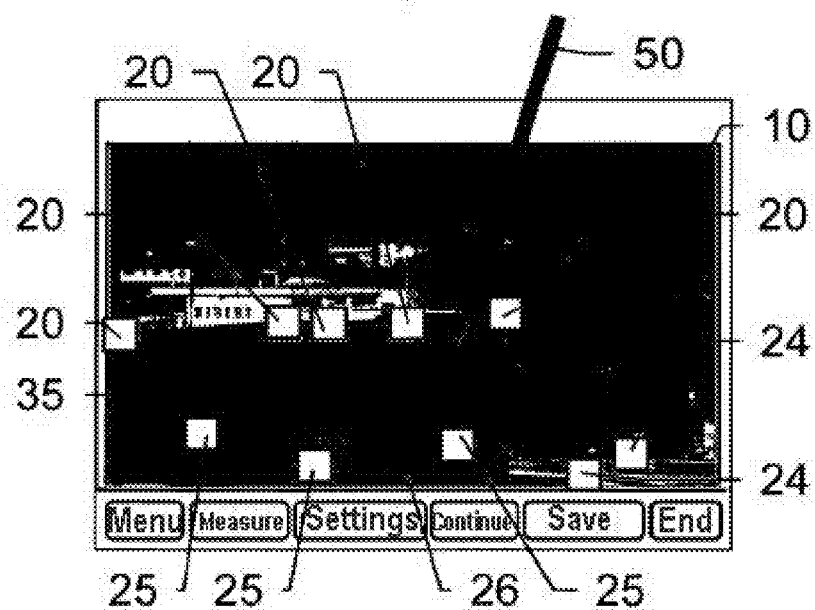
FIGS. 9a-c show a further embodiment according to the invention of the definition of the selection criterion for filtering the object data.
Figure 9B:
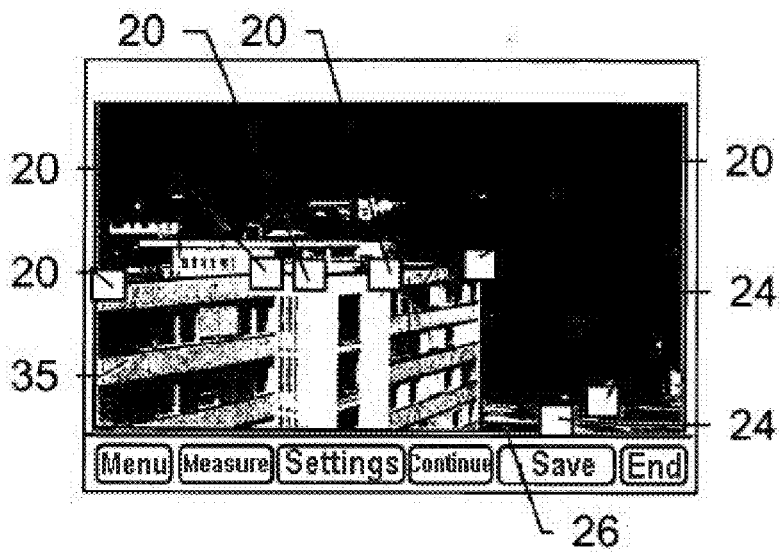
Figure 9C:
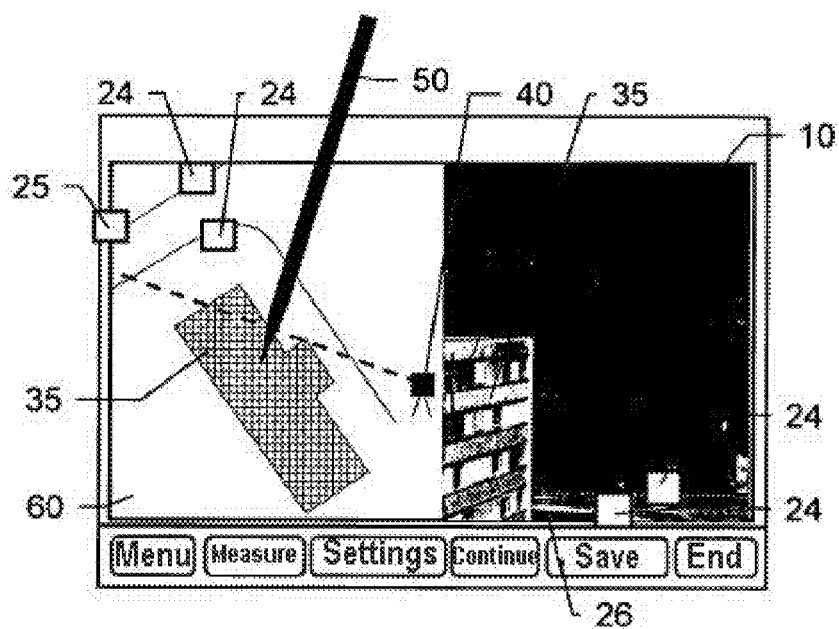

FIGS. 9a-c show a further embodiment according to the invention for defining the selection criterion for filtering the object data or the markings 20, 24, 25, 26. In this context, FIG. 9a shows a camera image 10, in which a building 35 and the markings 20, 24, 25, 26 are displayed. Moreover, a stylus 50 is shown, by means of which e.g. a user can perform an entry by touching the camera image 10. Here, the stylus 50 is used to mark the building 35 for filtering the object data markings 20, 24, 25, 26—for example so that a better overview about relevant data can be offered to the user. By means of the filtering function according to the invention, it is now possible to undertake position comparisons of the object data 20, 24, 25, 26, both amongst themselves and also in relation to the position and the extent of the building 35. Here, the building position and size can be determined e.g. by the positions of the object data (in respect of markings 20). During the comparison of the building position with the object data, it is now possible to determine that the object data markings 25 and 26 are, at least in part, covered by the building 35 façade from the view of the camera (by means of which the camera image was captured) or from the view of the surveying device. In the following, it is now possible, in particular in an automated fashion within the scope of the filter functionality, to remove the covered object data markings 25 and 26 and only display those markings 20, 24 and 26 (in part)—together with the building 35—which are visible from the view of the camera of the surveying device. This result of the filtering is shown in FIG. 9b.

In particular, there also can be corresponding marking of an obstacle in a map view 60 as per FIG. 9c, wherein the positions of the markings 20, 24, 25, 26 of the object data and of the building 35 of a recorded camera image 10 are correspondingly displayed in the map view 60 in one half of the display. This map view moreover shows the position 40 of the surveying device and hence of the camera. The building 35, which in this case causes perspective covering of the object data marking 25 from the view of the camera, can, in this view 60, once again be marked by a stylus 50 or defined by means of an entry on e.g. a keyboard of the surveying device. By marking the building 35, this can be identified as an obstacle and it follows that those markings 25 which are covered by the building 35 can be removed by means of the filter functionality according to the invention. As a result of the filtering, the camera image 10 is shown in the second half of the display, wherein only the markings 24, 26 for the object data which are not covered are still displayed there.

It is understood that these displayed figures only schematically display possible exemplary embodiments. According to the invention, the various approaches likewise can be combined with one another and with methods and devices for surveying of the prior art.

What is claimed is:

1. A geodetic surveying device that can be calibrated in a coordinate system such that, in a calibrated state, a setup position and an alignment of the surveying device are known, the geodetic surveying device comprising:
   a sighting unit that is pivotable about two axes, wherein the sighting unit:
      defines a sighting direction in the coordinate system; and
      includes a camera with a current viewing region for capturing a camera image substantially in the sighting direction, wherein the viewing region can be updated depending on the sighting direction;
   angle and distance measuring functionality;
   object data that is stored in a database with a position reference specifying a position in the coordinate system;
   a graphical output unit having a display, on which the camera image and the object data can be displayed; and
   a microprocessor, wherein:
      the surveying device has a filter functionality that performs under the automatic control of the microprocessor:
         dynamic filtering that filters the object data depending on the current viewing region within the scope of the dynamic filtering; and
         static filtering that filters the object data depending on a selection criterion that can be selected or predetermined by the user within the scope of the static filtering, wherein the selection criterion depends on a position relation, an angle relation, an object property and/or information provided by the surveying device; and
      the object data filtered by the dynamic and static filtering are displayed graphically by means of markings that represent the object data on the output unit together with the camera image and that are displayed on a respective position in the camera image referenced by the position reference.

2. The geodetic surveying device as claimed in claim 1, wherein:
   the selection criterion is definable depending on:
      a current distance measurement; and/or
      a current position of a focusing lens, wherein the position of the focusing lens can be adjusted manually or automatically.

3. The geodetic surveying device as claimed in claim 1, wherein:
   the selection criterion is definable depending on a distance threshold or angle threshold.

4. The geodetic surveying device as claimed in claim 3, wherein:
   the selection criterion is definable depending on:
      a current distance measurement; and/or
      a current position of a focusing lens, wherein the position of the focusing lens can be adjusted manually or automatically.

5. The geodetic surveying device as claimed in claim 1, wherein:
   the selection criterion is definable such that those object data which have a position, defined by the respective position reference:
      within a first distance range defined in relation to the setup position of the surveying device;
      within a second distance range defined in relation to the position of specific object data;
      within an angular range that can be defined in the viewing region; or
      within an image region defined in the camera image,
   can be inserted or removed when carrying out the filter functionality.

6. The geodetic surveying device as claimed in claim 1, wherein:
   the selection criterion is definable such that, depending on a body position defined by a body and depending on a body size, some of the object data can be removed when carrying out the filter functionality.

7. The geodetic surveying device as claimed in claim 6, wherein:
   the removed object data are perspectively covered in the camera image due to the body position and the body size of the body; and
   the body is embodied by an object captured in the camera image or by an object predefined virtually.

8. The geodetic surveying device as claimed in claim 1, wherein:
   the selection criterion is definable by at least one of:
      the camera image;
      a top view display with the object data displayed therein; and
      entering position information using an input unit.

9. The geodetic surveying device as claimed in claim 1, wherein:
   the filter functionality is carried out automatically depending on a measurement requirement known in advance.

10. The geodetic surveying device as claimed in claim 1, further comprising:
    a non-transitory machine-readable medium having a computer program code for carrying out a method for filtered display of object data stored in the database of the geodetic surveying device with the respective position reference specifying the position in the coordinate system, wherein the surveying device can be calibrated in the coordinate system such that, in the calibrated state, the setup position and the alignment of the surveying device are known, the method comprising:
       capturing the camera image using the camera with the current viewing region;
       displaying the camera image and the object data on the graphical output unit having the display;
       performing filtering of the object data, the filtering including at least one of:
          dynamic filtering by which the object data are filtered depending on the current viewing region; and
          static filtering by which the object data are filtered depending on the selection criterion that can be selected or predetermined by the user, the selection criterion depending on the position relation, the angle relation, the object property and/or information provided by the surveying device; and graphically displaying the object data filtered by the dynamic filtering or static filtering on the graphical output unit using markings representing the object data, together with the camera image, wherein the markings are displayed on the respective position in the camera image referenced by the position reference.

11. A method for filtered display of object data stored in a database of a geodetic surveying device with a respective position reference specifying a position in a coordinate system, wherein the surveying device can be calibrated in a coordinate system such that, in a calibrated state, a setup position and an alignment of the surveying device are known, the method comprising:

capturing a camera image using a camera with a current viewing region;

displaying the camera image and the object data on a graphical output unit having a display;

performing filtering of the object data, the filtering including at least one of:

dynamic filtering by which the object data are filtered depending on the current viewing region; and static filtering by which the object data are filtered depending on a selection criterion that can be selected or predetermined by the user, the selection criterion depending on a position relation, an angle relation, an object property and/or information provided by the surveying device; and graphically displaying the object data filtered by the dynamic filtering or static filtering on the graphical output unit using markings representing the object data, together with the camera image, wherein the markings are displayed on a respective position in the camera image referenced by the position reference.

12. The method as claimed in claim 11, wherein:
the filtering is performed depending on at least one of:
a current distance measurement; and
a current position of a focusing lens, wherein the position of the focusing lens is adjusted manually or automatically.

13. The method as claimed in claim 11, wherein:
the filtering is performed depending on a distance threshold and/or angle threshold.

14. The method as claimed in claim 13, wherein:
the filtering is performed depending on at least one of:
a current distance measurement; and
a current position of a focusing lens, wherein the position of the focusing lens is adjusted manually or automatically.

15. The method as claimed in claim 11, further comprising:
defining the selection criterion is definable such that those object data which have a position, defined by the respective position reference:

within a first distance range defined in relation to the setup position of the surveying device;
within a second distance range defined in relation to the position of specific object data;
within a defined angular range; or
within an image region defined in the camera image, are inserted or removed.

16. The method as claimed claim 11, wherein performing filtering comprises:
depending on a body position and a body size of a body, removing some of the object data during filtering.

17. The method as claimed in claim 16, wherein:
wherein the removed object data are perspectively covered in the camera image due to the body position and the body size of the body.

18. The method as claimed in claim 11, further comprising:
defining the selection criteria by at least one of:
the camera image;
a top view display with the object data displayed therein; and
entering position information using an input unit.

19. The method as claimed in claim 11, wherein:
filtering and displaying the object data is performed automatically depending on a measurement requirement known in advance.

20. A computer program product with program code, which is stored on a non-transitory machine-readable medium, for carrying out a method for filtered display of object data stored in a database of a geodetic surveying device with a respective position reference specifying a position in a coordinate system, wherein the surveying device can be calibrated in a coordinate system such that, in a calibrated state, a setup position and an alignment of the surveying device are known, the method comprising:

capturing a camera image using a camera with a current viewing region;

displaying the camera image and the object data on a graphical output unit having a display;

performing filtering of the object data, the filtering including at least one of:

dynamic filtering by which the object data are filtered depending on the current viewing region; and static filtering by which the object data are filtered depending on a selection criterion that can be selected or predetermined by the user, the selection criterion depending on a position relation, an angle relation, an object property and/or information provided by the surveying device; and graphically displaying the object data filtered by the dynamic filtering or static filtering on the graphical output unit using markings representing the object data, together with the camera image, wherein the markings are displayed on a respective position in the camera image referenced by the position reference.

* * * * *